United States Patent [19]

Lomasney

[11] Patent Number: 5,048,637
[45] Date of Patent: Sep. 17, 1991

[54] BUMPER SYSTEM FOR AUTOMATIC GUIDED VEHICLES

[75] Inventor: Peter E. Lomasney, Grand Rapids, Mich.

[73] Assignee: Mannesmann Demag Corporation, Grand Rapids, Mich.

[21] Appl. No.: 498,531

[22] Filed: Mar. 26, 1990

[51] Int. Cl.$^5$ .............................................. B60K 28/10
[52] U.S. Cl. ..................................... 180/274; 180/275; 180/279
[58] Field of Search ........................ 180/276, 278, 96.1, 180/274, 275, 279, 83; 293/2, 4

[56] References Cited

U.S. PATENT DOCUMENTS

| | | | |
|---|---|---|---|
| 2,720,275 | 10/1955 | Thayer | 180/83 |
| 3,599,744 | 8/1971 | Satterfield et al. | 180/96 |
| 3,664,701 | 5/1972 | Kondur | 293/4 |
| 3,901,346 | 8/1975 | Kohls et al. | 180/96 |
| 4,137,984 | 2/1979 | Jennings et al. | 180/98 |
| 4,288,121 | 9/1981 | Wiechert | 293/4 |
| 4,635,982 | 1/1987 | Feldmann et al. | 293/2 |
| 4,641,871 | 2/1987 | Vaughn | 180/275 |
| 4,688,656 | 8/1987 | Kent | 180/279 |
| 4,730,690 | 3/1988 | McNutt et al. | 180/274 |
| 4,802,548 | 2/1989 | Kausch | 180/274 |

FOREIGN PATENT DOCUMENTS

| | | | |
|---|---|---|---|
| 2618403 | 10/1977 | Fed. Rep. of Germany . | |
| 1475846 | 4/1989 | U.S.S.R. | 180/275 |
| 1129915 | 10/1968 | United Kingdom . | |

*Primary Examiner*—Kenneth R. Rice
*Attorney, Agent, or Firm*—Warner, Norcross & Judd

[57] ABSTRACT

A bumper system for use on automatic guided vehicles includes a bumper, a pair of double-action, spring biased hinges, and a pair of switches cooperating with the hinges. The bumper is an arcuate, resilient strip which extends across the entire forward portion of the vehicle and is fixed at its opposite ends to the hinges. Upon engagement with an obstruction, the bumper flexes and pivots either of the hinges. Such movement by the hinges is sensed by the switches which, in turn, cooperate with the drive control system to stop the vehicle.

3 Claims, 4 Drawing Sheets

BUMPER SYSTEM FOR AUTOMATIC GUIDED VEHICLES

BACKGROUND OF THE INVENTION

The present invention pertains to a bumper system for use on an automatic guided vehicle (AGV) and in particular to such a system capable of stopping the vehicle when an object is struck.

Briefly, AGV's are driverless vehicles which transport goods and materials from one location to another. Generally, AGV's are controlled by an on-board computer and follow a cable embedded in the floor. Ideally, the AGV's path is kept clear of any obstacles. Nevertheless, people, products or other materials are occasionally in the AGV's path. The AGV should therefore preferably have the capacity to sense such obstructions and come to a stop.

Safety bumper systems with the capacity to stop the movement of an AGV are commonly used. One such system involves a bumper comprised of two superimposed electrically conductive strips. In the normal driving position, the strips are spaced apart with a small gap defined therebetween. Upon striking an object the strips contact each other and function as a switch to stop the vehicle. However, an uneven driving motion or a rough surface can cause the strips to be jostled and thereby contact one another and stop the vehicle without the imposition of an obstruction. Further, the conductive bumper strips are generally composed of metal and are therefore susceptible to being dented or deformed, detracting from performance and appearance.

Another system has involved optical sensors designed to detect movement of the bumper. In particular, a reflector is generally positioned on the bumper to cooperate with at least one sensor strategically mounted on the AGV. Examples of these arrangements are illustrated in U.S. Pat. No. 4,802,548 to Kausch, U.S. Pat. No. 4,730,690 to McNutt et al., and U.S. Pat. No. 3,664,701 to Kondur. In certain situations, however, the reflector can remain within the beam of the sensor even though an obstruction had been struck. Additionally, reflectors have often been placed on the most remote portions of the bumpers where swaying can become a significant factor. Swaying in such arrangements can cause the reflector to stop the AGV without the bumper striking an obstruction. Further, those systems are relatively expensive.

Safety bumpers have also been designed to cooperate with switches engaging movable links and the like which are adapted to move with the bumper when an object is contacted. Examples of such constructions are illustrated in U.S. Pat. No. 4,635,982 to Feldmann et al., U.S. Pat. No. 4,288,121 to Wiechert, U.S. Pat. No. 4,137,984 to Jennings et al., and U.S. Pat. No. 3,599,744 to Satterfield et al. However, switch arrangements have often involved elaborate mechanisms and been costly to manufacture.

SUMMARY OF THE INVENTION

In the present invention, an efficient and reliable bumper system is provided to stop an AGV upon engaging an obstruction. More specifically, the present bumper system includes a resilient bumper positioned across the front of the AGV and secured at its ends to a pair of double-action, spring biased hinges. A switch cooperates with each hinge to sense movement of the bumper as occurs in contacting an object to signal the vehicle to stop.

The construction of the present invention overcomes many of the aforementioned problems of the prior art. In particular, by mounting the switches at the connection points of the bumper, there is less risk of stopping the vehicle by mere swaying of the bumper. Further, the movement of the hinges to actuate the switches provides the needed security that the system will properly function to stop the vehicle on impact with an obstruction. Additionally, the system is subject to efficient and economical fabrication.

These and other objects, advantages, and features of the present invention will be more fully understood and appreciated by reference to the written specification and appended drawings.

DETAILED DESCRIPTION OF THE PREFERRED EMBODIMENT

Figure 1:
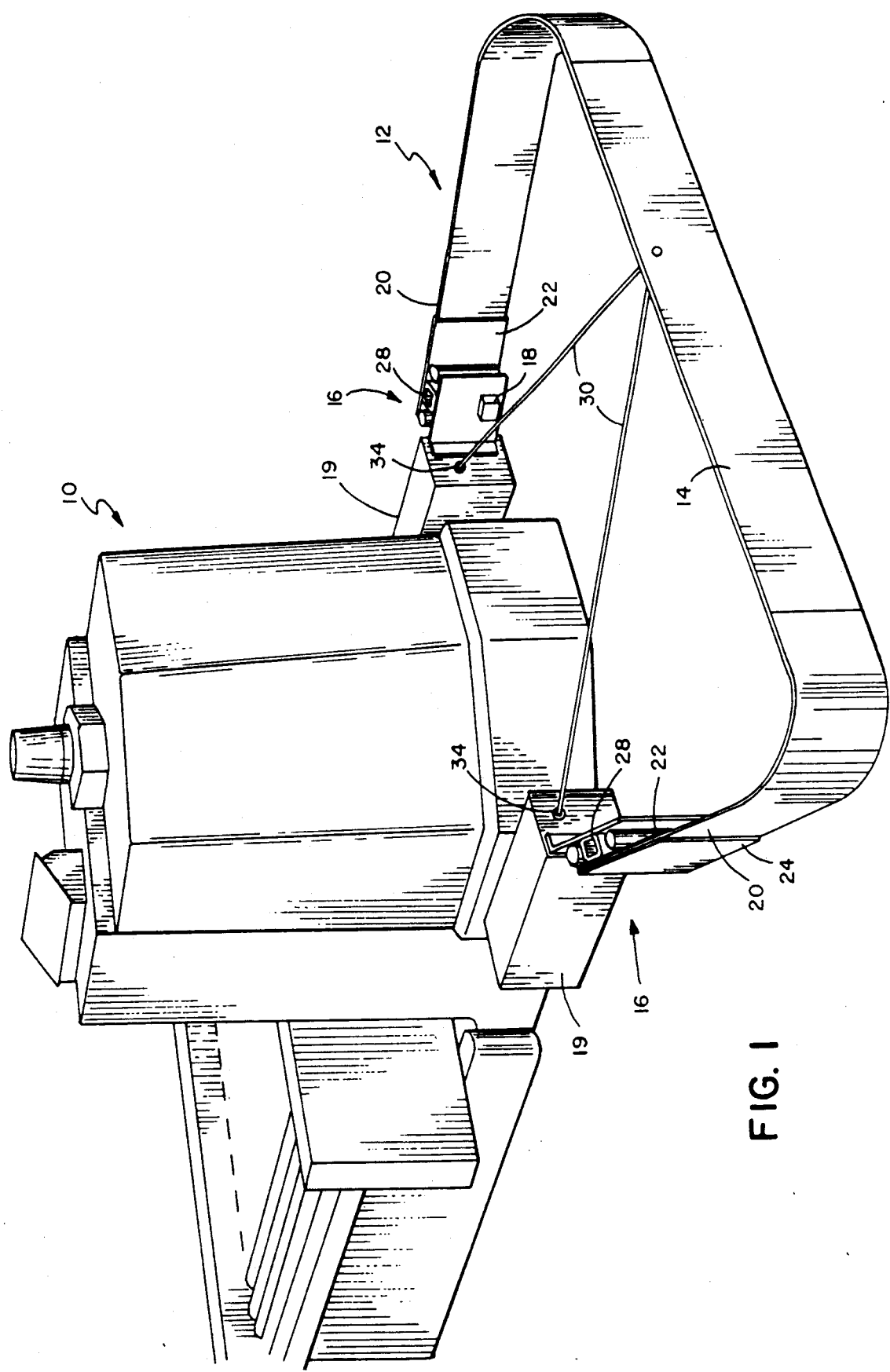
FIG. 1 is a perspective view of an automatic guided vehicle having the present bumper system.

In the preferred embodiment an automatic guided vehicle (AGV) 10 includes a forwardly projecting safety bumper system 12. Bumper system 12 includes a bumper 14, a pair of double-action hinges 16, and a pair of switches 18 (FIG. 1). The components of system 12 effectively cooperate to sense the engagement of an obstruction and stop the AGV's movement. As can be readily appreciated, bumper system 12 is adaptable for use on a variety of different AGV's.

Bumper 14 is an elongated, resilient strip which extends across the entire front portion of AGV 10. Although the specific transverse dimension of the bumper is not critical, it should be at least equal to the widest portion of the AGV to assure proper clearance of the vehicle's path. In the illustrated embodiment (FIG. 1), the bumper is extended across a larger dimension than the width of vehicle 10 by spacers 19, to thereby accommodate the pulling of a larger trailer. Additionally, bumper 14 projects a considerable distance in front of AGV 10 to ensure that the vehicle will have sufficient distance to come to a stop before the vehicle body strikes the obstruction.

Figure 2:
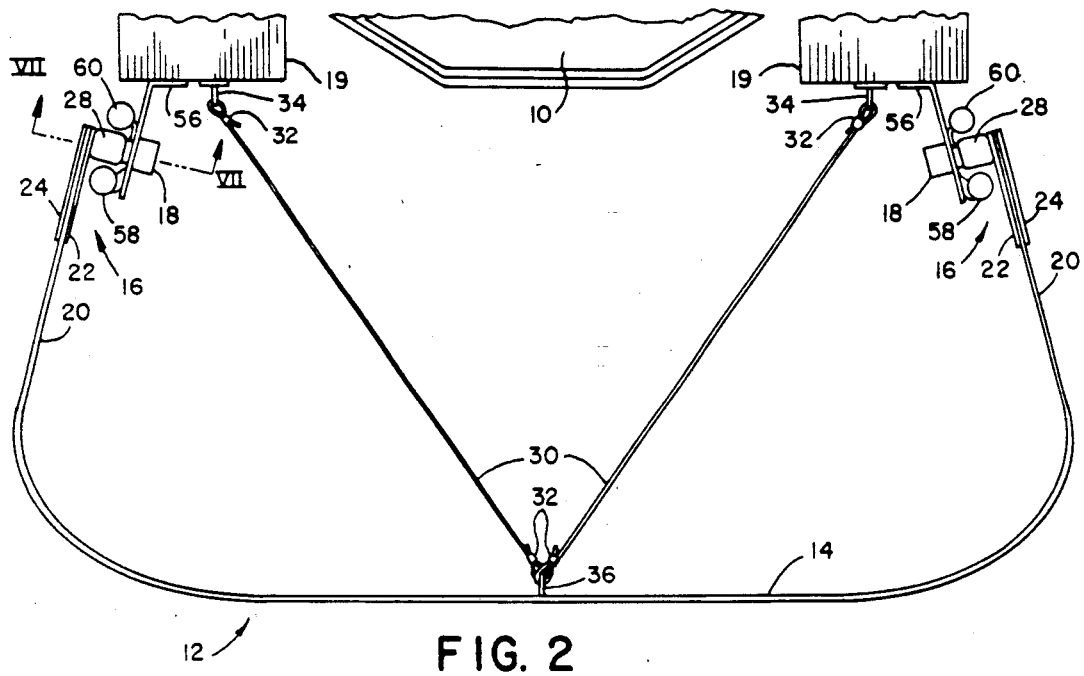
FIG. 2 is a top plan view of the bumper system.
Figure 3:
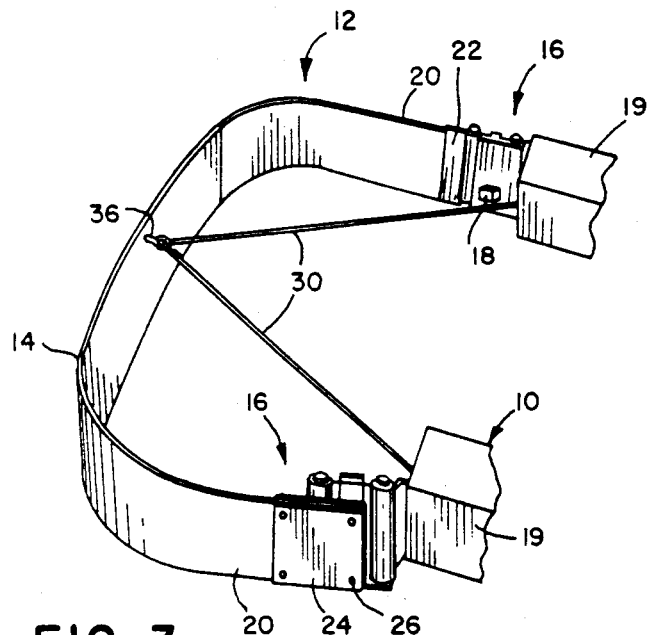
FIG. 3 is a perspective view thereof.

Preferably, bumper 14 is a continuous, arcuate strip so that hinges 16 will be properly moved to actuate a switch 18 upon contact with an obstruction (FIGS. 1-3). The particular curvature, though, may vary widely to meet the specific dimensions and needs of the AGV. Bumper 14 is generally composed of a plastic material, such as that sold under the trademark LEXAN by General Electric Plastics Division of Mt. Vernon, Ind.; but may be composed of other materials having the requisite resiliency.

Each end 20 of bumper 14 is movably attached to AGV 10 by double-action hinges 16 (FIGS. 2 and 4-10). More specifically, ends 20 are each sandwiched between a pair of rigid plates 22, 24 for added strength. Plates 22, 24 are generally composed of steel or aluminum, but could be composed of many other materials. Preferably, ends 20 and plates 22, 24 are provided with aligned holes through which fasteners 26, such as bolts, are passed to form a tightly layered structure. To facilitate the coupling of ends 20 with hinges 16, the inner surface of mounting plate 22 is secured to spacer blocks 28 by welding.

Bumper 14 is further supported by a pair of cables 30 (FIGS. 1-3). Cables 30 each extend from an outer portion of AGV 10 to the center of bumper 14. The ends of the cables 30 are looped by conventional securing elements 32, to interconnect with AGV eye brackets 34 and bumper eye 36. The V-shaped configuration of cables 30 acts to reduce swaying of the bumper and thereby reduce "false" signals.

Figure 6:
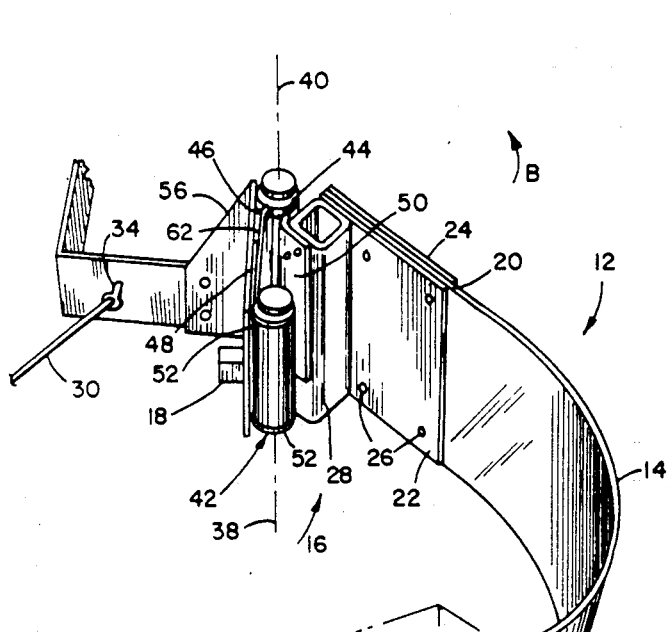
FIG. 6 is an enlarged perspective view of one of the hinges in a second activated position.
Figure 4:
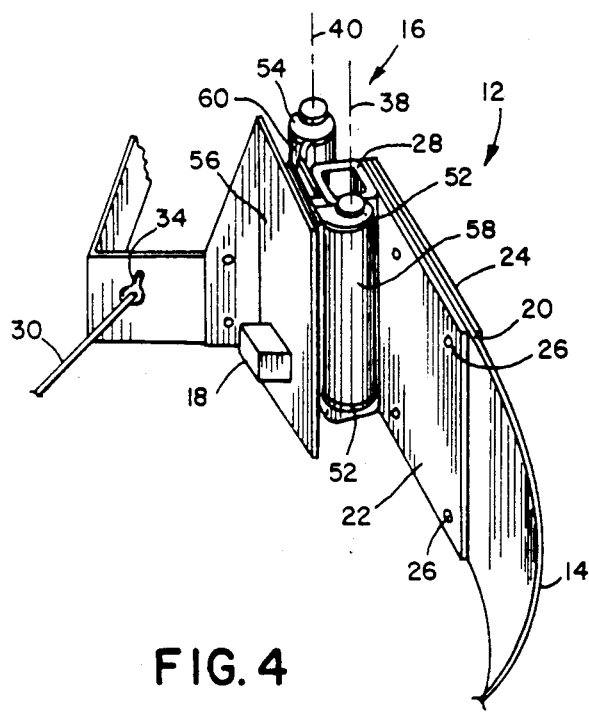
FIG. 4 is an enlarged perspective with parts broken away, view of one of the hinges of the bumper system in a closed position.
Figure 5:
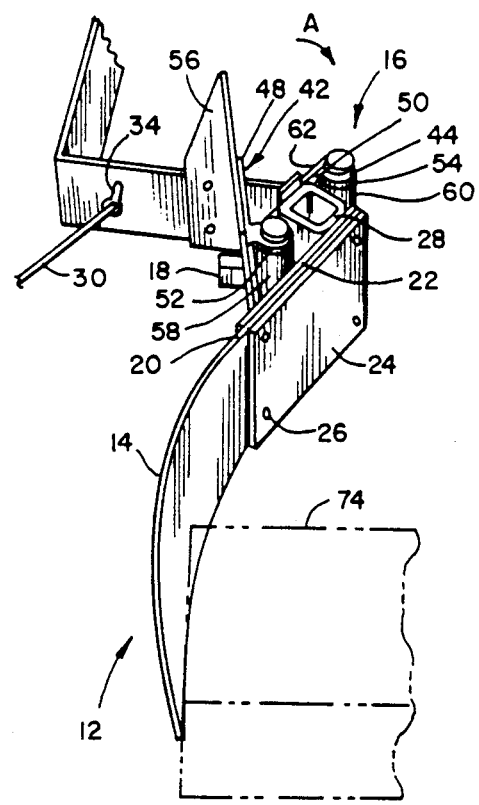
FIG. 5 is an enlarged perspective view of one of the hinges in a first activated position.

Hinges 16 are of the double-action, spring-biased type, such as those sold as part number 3029-6 or M 3029-8, manufactured by Bommer Industries of Landrum, S.C. The construction of these hinges is well-known and will not be discussed in great detail. In general, double-action hinges 16 permit pivoting motion in two opposite rotative directions A, B, and about two spaced apart pivot axes 38, 40 (FIGS. 4-6). Further, each hinge 16 is comprised primarily of four major components—namely, an inner first base 42, and outer second base 44, a pintle assembly 46, and an inner torsion spring mechanism 44 (FIG. 4).

Inner and outer bases 42, 44 each include a base plate 48, 50 and a pair of spaced apart annular ears 52, 54 (FIGS. 4-10). More specifically, inner base plate 48 is fixedly secured to AGV 10 (via a bracket 56 or the like) through the use of fasteners 26 or other securing means. Inner base ears 52 are positioned to project laterally outward. Outer base plate 50 is fixedly secured to spacer block 28, which in turn is fixed to one of the bumper ends 20. Outer base ears 54 are positioned to project generally toward AGV 10.

Pintle assembly 46 includes a first cylindrical body 58, a second cylindrical body 60, and a joining plate 62 interconnecting bodies 58, 60. First body 58 is rotatively received between inner base ears 52 to define the first pivot axis 38. Second body 60 is rotatively received between outer base ears 54 to define the second axis 40. As explained below, this cooperative arrangement permits ends 20 to be pivoted about either axis 38, 40 depending on the engaged obstruction.

Figure 8:
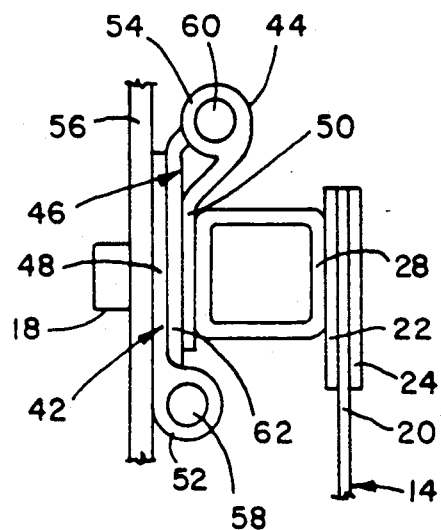
FIG. 8 is a top plan view of one of the hinges in the closed position.

Further, the inner torsion spring mechanisms 47 act to bias joining plate 62 against base plate 48, and plate 50 against joining plate 62. This biasing arrangement functions under normal operating conditions to "close" the hinges, so that plates 50 and 62 are collapsed against AGV bracket 56 (FIGS. 1, 4 and 8). Specifically, the springs preload the hinges so that normal operation of the AGV will not generate sufficient sway in the bumper to falsely activate the switches 18. To enhance the versatility of the operation, the hinges are preferably provided with adjustable spring mechanisms which enable one to vary the preload forces applied to hinges.

Figure 7:
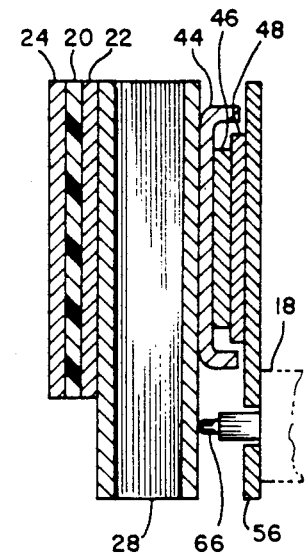
FIG. 7 is a cross-sectional view taken along lines VII—VII in FIG. 2.

Switches 18 are attached to the inner side 64 of bracket 56 so that its plunger 66, biased by spring 67, extends outward toward the inner surface of spacer block 28 (FIG. 7). The switches 18 are connected to the drive control circuitry (not shown) in conventional fashion, and the circuitry stops the AGV 10 when either of the switches is activated. In the preferred embodiment, the switches 18 may be either: a switch actuator, part number MCA 2711, by Honeywell Micro Switch Division of Southfield, Mich.; a switch, part number BA-2RT, by Honeywell Micro Switch Division of Southfield, Mich.; or a switch assembly, part number ES0AS2, by, Cutler Hammer Products of Milwaukee, Wis.

In the closed position plunger 66 is abuttingly engaged by spacer 28. The closed position of spacer 28 keeps switch 18 closed for uninterrupted AGV movement (FIGS. 4 and 8). However, should bumper 14 engage an obstruction, spacer 28 is moved in either of the two opposite pivoting directions to actuate switch 18 through the release of plunger 66 (FIGS. 5-6 and 9-10). Activation of switch 18 signals AGV 10 to stop its forward motion. The switches are adjustable in conventional fashion to select the amount of plunger movement required to actuate the switch. Such adjustment enables "fine-tuning" of the assembly so as to be insensitive to normal bumper sway and yet sensitive to contacted objects. As discussed above, the sensitivity of the assembly is further controlled by the amount of force applied to the hinges by the torsion springs. This force is adjustable by well known means in most commercial double hinges. The greater the force applied by the springs, the greater the force needed to move the hinges and stop the AGV.

OPERATION

In normal operation, the spring-biased hinges 16 maintain the plungers 66 in their depressed positions; and the AGV is driven in response to the control circuitry. However, when an object is contacted by the bumper 14, the bumper flexes and causes at least one of the two hinges to pivot against the force of the torsion springs, and release the associated switch plunger. Such actuation of either of the switches causes the control circuitry to stop the vehicle.

Figure 9:
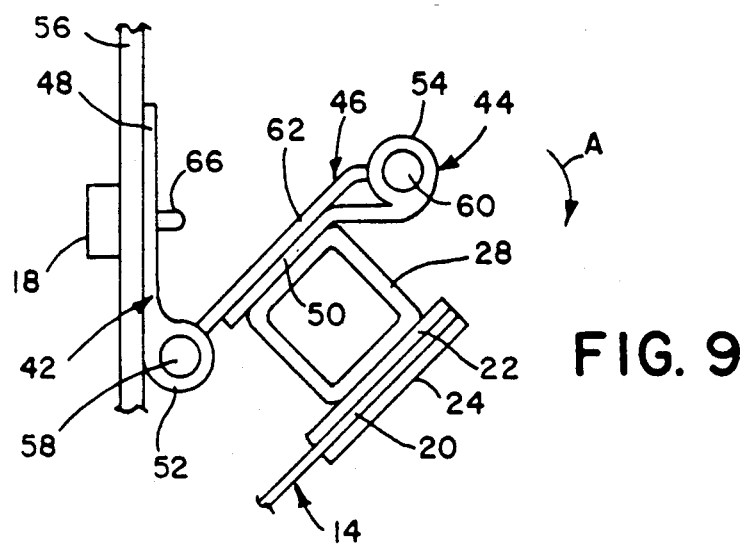
FIG. 9 is a top plan view of one of the hinges in the first activated portion.

For illustrative purpose, FIG. 5 shows bumper 14 striking an obstruction near one of its ends 20. As bumper 14 engages object 74 it flexes inward toward AGV 10. This flexing action pulls the near end 20 outward against the hinge's torsion springs and around the first pivot axis 38 (FIGS. 5 and 9). This rotative movement of end 20 pulls joining plate 62, second body 60, outer base plate 50, and spacer 28 as a unit (in direction A) about axis 38. As discussed above, movement of spacer 28 away from bracket 56 activates switch 18, which is connected to the drive control circuitry (not shown) to stop AGV 10.

Figure 10:
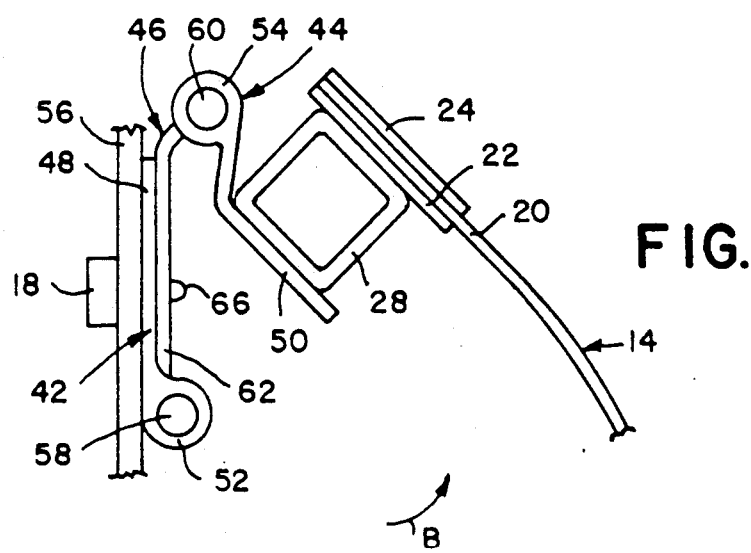
FIG. 10 is a top plan view of one of the hinges in the second activated position.

As a second example, FIG. 6 shows bumper 14 striking an obstruction near eye 36. In this instance, as bumper 14 contacts object 76 it flexes inwardly so as to push end 20 against the hinge's torsion springs and around second pivot axis 40 (FIGS. 6 and 10). This rotative movement of end 20 further pushes spacer 28 (in rotative direction B) about axis 40, so that plunger 66 is freed to activate switch 18. Switch 18, then, signals AGV 10 to stop.

The present invention provides an economical and straight-forward mechanical system for detecting contact with an unexpected object. The construction is reliable to consistently detect contact without triggering false signals due to bumper sway. Further, the switches and the torsion springs on the hinges are adjustable to fine-tune the sensitivity.

The above description is that of a preferred embodiment of the invention. Various alterations and changes can be made without departing from the spirit and broader aspects of the invention as set forth in the appended claims, which are to be interpreted in accordance with the principles of patent law, including the Doctrine of Equivalents.

The embodiments of the invention in which an exclusive property or privilege is claimed are defined as follows:

1. A bumper system for an automatic guided vehicle comprising:
    a resilient bumper projecting outwardly from the vehicle and including a pair of transversely spaced-apart ends;
    a pair of double-action spring-biased hinges attaching said bumper ends to said vehicle, each of said hinges comprising:
        an inner base plate fixedly secured to the vehicle;
        an outer base plate fixedly secured to a said bumper end;
        a joining plate extending between said inner base plate and said outer base plate;
        a first spring-loaded pivot means for hingedly joining a first end of said joining plate into said inner base and for biasing said joining plate in a home position against said base plate; and
        a second spring-loaded pivot means for hingedly joining a second end of said joining plate to said outer base plate and for biasing said outer base plate into a home position against said joining plate; and
    a pair of switch means each operatively associated with one of said pair of hinges for sensing deflection of said outer base plate away from said inner base plate and for signaling the vehicle to stop upon such deflection;
    whereby deflection of said bumper in a first direction causes pivoting deflection of a said outer base plate about said first pivot means away from said inner base plate, and deflection of said bumper in a second direction generally opposite said first direction causes pivoting deflection of a said outer base plate about said second pivot means.

2. The bumper system of claim 1 wherein said switch means are adjustable to vary the sensitivity of said switch means to said deflections.

3. The bumper system of claim 1 wherein said switch means each comprise a spring-biased plunger having a first orientation which permits the vehicle to operate and a second orientation which signals the vehicle to stop, wherein said plunger is held in said first orientation when the associated hinge is in the home position.

* * * * *